(12) United States Patent
Nakayama

(10) Patent No.: US 7,937,172 B2
(45) Date of Patent: May 3, 2011

(54) PROGRAM CREATING DEVICE FOR PROGRAMMABLE CONTROLLER, PROGRAM CREATING METHOD FOR PROGRAMMABLE CONTROLLER, AND RECORDING MEDIUM HAVING PROGRAM RECORDED THEREON

(75) Inventor: Yukio Nakayama, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 737 days.

(21) Appl. No.: 11/658,680

(22) PCT Filed: Jul. 26, 2005

(86) PCT No.: PCT/JP2005/013639
§ 371 (c)(1),
(2), (4) Date: May 2, 2007

(87) PCT Pub. No.: WO2006/011474
PCT Pub. Date: Feb. 2, 2006

(65) Prior Publication Data
US 2009/0192635 A1    Jul. 30, 2009

(30) Foreign Application Priority Data
Jul. 28, 2004   (JP) ............................. P2004-219855

(51) Int. Cl.
*G05B 19/42* (2006.01)
*G05B 11/01* (2006.01)
*G06F 9/44* (2006.01)
*G06F 9/45* (2006.01)

(52) U.S. Cl. ............... 700/86; 700/18; 700/24; 700/26; 717/106; 717/140

(58) Field of Classification Search ............. 700/86, 700/11, 17, 18, 23–26; 717/100, 106, 120, 717/122, 140, 154, 151, 152
See application file for complete search history.

(56) References Cited

U.S. PATENT DOCUMENTS

| 4,455,621 A * | 6/1984 | Pelley et al. ............... 700/25 |
| 5,287,548 A * | 2/1994 | Flood et al. ............... 700/18 |

(Continued)

FOREIGN PATENT DOCUMENTS

CA      2 311 579 A1     12/2001

(Continued)

OTHER PUBLICATIONS

Korean Office Action for KR-10-2007-7001902 dated Mar. 14, 2008.

(Continued)

*Primary Examiner* — Crystal J Barnes-Bullock
(74) *Attorney, Agent, or Firm* — Sughrue Mion, PLLC

(57) ABSTRACT

It is an object to acquire a program creating device for a programmable controller which is able to create a sequence program without grasping a procedure of an address of an individual parameter area allocated to an object module when a setting of parameters of various functional modules for the programmable controller is executed.

The device constitutes setting information creating means 12 for preparing module setting information of a parameter type for the programmable controller by using specific information which is included a functional module, analysis and conversion means 14 for creating a source file to be converted into a sequence program which programmed an operation of the programmable controller according to an analysis of a parameter of the module setting information, and program converting and inserting means 31 for converting a file created by the analysis and conversion means into the sequence program.

7 Claims, 7 Drawing Sheets

U.S. PATENT DOCUMENTS

| | | | |
|---|---|---|---|
| 5,291,479 A * | 3/1994 | Vaziri et al. | 370/264 |
| 5,524,244 A * | 6/1996 | Robinson et al. | 717/140 |
| 5,535,342 A * | 7/1996 | Taylor | 710/315 |
| 6,275,955 B1 | 8/2001 | Klein et al. | |
| 6,334,076 B1 * | 12/2001 | Sakurai et al. | 700/86 |
| 6,466,827 B1 | 10/2002 | Stine | |
| 6,505,341 B1 * | 1/2003 | Harris et al. | 717/100 |
| 7,284,241 B2 * | 10/2007 | Heishi et al. | 717/152 |
| 7,676,651 B2 * | 3/2010 | Yamada et al. | 712/210 |
| 2002/0100031 A1 * | 7/2002 | Miranda et al. | 717/152 |
| 2004/0133879 A1 * | 7/2004 | Yoshimura et al. | 717/120 |
| 2008/0313614 A1 * | 12/2008 | Yoshimura et al. | 717/120 |

FOREIGN PATENT DOCUMENTS

| | | |
|---|---|---|
| JP | 11-338732 A | 12/1989 |
| JP | 9-237204 A | 9/1997 |
| JP | 11003105 A * | 1/1999 |
| JP | 11-305809 A | 11/1999 |
| JP | 2001-67106 A | 3/2001 |
| JP | 2001-067106 A | 3/2001 |
| JP | 2003-263202 | 9/2003 |
| JP | 2003-263202 A | 9/2003 |
| KR | 20010094580 B1 | 11/2001 |
| KR | 100331443 B1 | 3/2002 |

OTHER PUBLICATIONS

German Office Action dated May 5, 2010 in German application No. 11 2005 001 790.7.

* cited by examiner

PROGRAM CREATING DEVICE FOR PROGRAMMABLE CONTROLLER, PROGRAM CREATING METHOD FOR PROGRAMMABLE CONTROLLER, AND RECORDING MEDIUM HAVING PROGRAM RECORDED THEREON

TECHNICAL FIELD

The present invention relates to a program creating device for creating a program required for operating various functional modules for a programmable controller.

BACKGROUND ART

As a method of setting a parameter required for various known functional modules for a programmable controller, such as setting values required for a specification requested by a user in an object functional module, a method is known in which a sequence program including a setting value which is meaningfully set for each functional module is prepared outside the programmable controller and the sequence program is transmitted to the programmable controller for execution. Here, the setting value which is meaningfully set for each functional module is transmitted to an inner memory area of each object functional module which is opened to the user or an inner memory area for checking a state of a functional module.

The sequence program is prepared by using an address of each parameter area which is allocated to an object module at the time of setting a parameter of various functional modules for the programmable controller by the use of the sequence program. The sequence program prepared by a programmer or a sequence program designer is checked by a debugging operation to validate whether the parameter is correctly set for the various functional modules.

In order to solve the above-mentioned problem, that is, in order to reduce a programmer's labor for the debugging operation, there has been suggested a method using a character string (a label name) allocated to the address instead of using the address of an individual parameter area allocated to the object module as an easy mark method for the programmer of the sequence program (see Patent Document 1). However, the method is equal to the known technology in that it requires preparing the sequence program for setting the parameter.

Patent Document 1: Japanese Patent Application Publication No. 11-338732.

Meanwhile, as another method of setting the various functional modules for the programmable controller, there is a method of using application software. In this method, instead of setting a parameter using the sequence program, the parameter set by using parameter setting values of the application software is treated as the parameter of the programmable controller and then transmitted to the address of the parameter area of the various functional modules at the time of operating the programmable controller, thereby setting the parameter. At this time, the application software sets the parameter by using an item name defined for each of the functional modules without using the address.

DISCLOSURE OF THE INVENTION

Problem that the Invention is to Solve

However, one of the known methods of setting a parameters setting of various functional modules for a programmable controller, the sequence program is created by using an address of each parameter area allocated to an object module. In this respect, a programmer of the sequence program needs to pay attention not to set the wrong address and inadequate contents or change the sequence program in accordance with a difference of data types specific to the object modules such as bit, byte, word, and double word.

In order to check the contents from the sequence program, the address of each parameter area allocated to the various functional modules needs to be grasped. When there are many setting items and many contents and the like in many quarters, it is a problem that a debugging operation takes time since the programmer of the sequence program can easily make a mistake about the address, a setting value omission and the like due to an increased number of management processes.

When parameter setting value which is set by using another known method, an application software is used as a parameter of the programmable controller, and the sequence program can execute a transmission to the address of parameter area without preparing the sequence program. Meanwhile, when a setting value is changed because of an adjusting and the like after completing a setting, the application software which is various functional modules setting means for the programmable controller needs to be prepared essentially, then there is a problem that the sequence program can not execute the parameter setting of each functional module like other controlling program.

The present invention is contrived to solve the problems concerning a setting of various functional modules parameters for the programmable controller. It is an object to acquire a program creating device for the programmable controller which can create the sequence program without grasping a procedure of the address of an individual parameter area allocated to an object module.

Means for Solving the Problem

The present invention relates to a program creating device for a programmable controller which is used by connecting to the programmable controller. The device includes setting information creating means for preparing module setting information of parameter type for the programmable controller by using specific information of which each parameter is included in each functional module, analysis and conversion means for creating a source file to be converted into a sequence program which programmed an operation of the programmable controller according to an analysis of a parameter of the module setting information, and program converting and inserting means for converting a file created by the analysis and conversion means into the sequence program.

ADVANTAGE OF THE INVENTION

The present invention includes setting information creating means for preparing module setting information of a parameter type for the programmable controller by using specific information which is included a functional module, analysis and conversion means for creating a source file to be converted into a sequence program which programmed an operation of the programmable controller according to an analysis of a parameter of the module setting information, and program converting and inserting means for converting a file created by the analysis and conversion means into the sequence program, whereby an address destination mistake and an abnormal programming in format caused by a difference of data type can be effectively prevented in advance because the sequence program is automatically created without grasping an address of an individual parameter area allocated to a various functional modules for the programmable controller.

DESCRIPTION OF REFERENCE NUMERALS AND SIGNS

Figure 1:
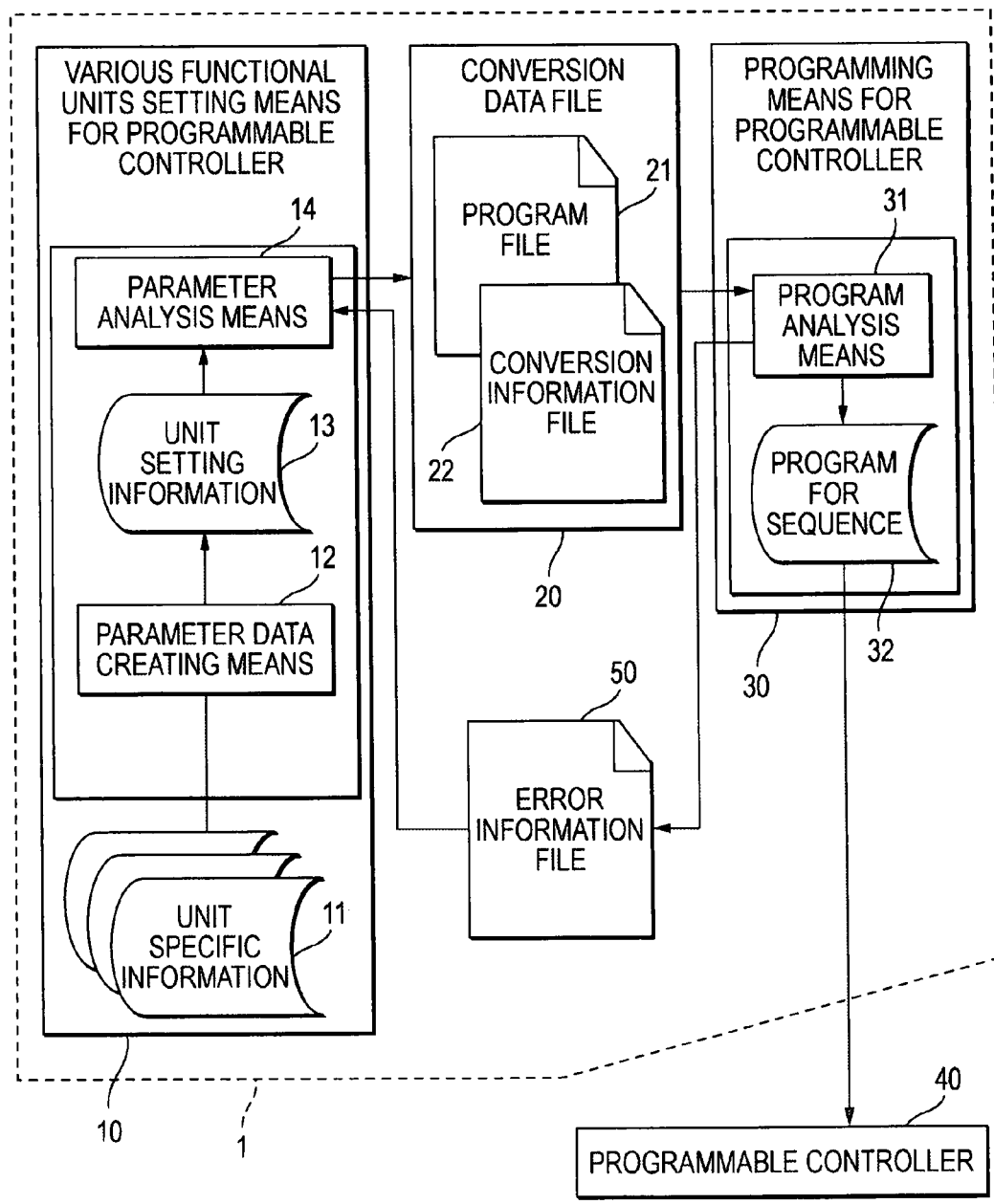
FIG. 1 is a diagram illustrating a configuration of a program creating device for a programmable controller and a programmable controller to which transmits a sequence program from the device according to the first embodiment of the present invention.

1: program creating device for programmable controller
10: various functional modules setting means
11: module specific information
12: parameter data creating means
13: module setting information
14: parameter analysis means
20: conversion data recording means
21: program file
22: conversion information file
30: programming means
31: program analysis means
32: program for sequence
40: programmable controller
50: error information file
100: overall offset
110: functional module identifier
120: initial setting value
200: number of setting items (n)
210: item$_1$ relative address
220: item$_2$ relative address
230: item$_n$ relative address
240: setting item$_1$
250: setting item$_n$
300: writing trigger signal
310: object address
320: number of setting data
330: setting data

BEST MODE FOR CARRYING OUT THE INVENTION

The preferred embodiments of the invention will be described in a first embodiment and a second embodiment.

First Embodiment

FIG. 1 is a configuration diagram illustrating a program creating device 1 for a programmable controller and a programmable controller 40 to which transmits a sequence program from the device. The program creating device 1 for the programmable controller converts an operation procedure of an individual functional module and converts a setting parameter of an individual module into a sequence program at the time of an operation. The program creating device 1 includes: various functional modules setting means 10 for the programmable controller which has a sequence part operating the various functional modules for the programmable controller according to the sequence program and executing an editing, a writing, a reading and the like of parameter; conversion data recording means 20 which stores information outputted from the various functional modules setting means 10 for the programmable controller and converted into the sequence program; and programming means 30 for the programmable controller which conducts an editing, a setting and the like of the sequence program.

Hardware of the program creating device 1 for a programmable controller can be configured as a part of a function of a personal computer. Each software file constituting the program creating device for the programmable controller is stored in a memory of a personal computer or a recording medium, or the program creating device can be embodied by the use of a CPU of the personal computer with software. Alternatively, even when the hardware is not the personal computer, the program creating device can be embodied by the use of the CPU and the like executing the software and the recording medium for recording the software and the file.

The various functional modules setting means 10 for the programmable controller includes parameter data creating means 12 which creates parameter type module setting information 13 for the programmable controller, and parameter analysis means 14 which prepares a conversion data file having information related to a source of the sequence program from the module setting information 13 and outputs to conversion data recording means 20, on the basis of module specific information 11 stored module specific information.

According to the configuration of the embodiment, the parameter data creating means 12 serves as setting information creating means and the parameter analysis means 14 serves as an analysis and conversion means respectively.

Conversion data recording means 20 stores the conversion data file outputted from the parameter analysis means 14. The conversion data file includes a program file 21 which stores the sequence program expressed in text format and a conversion information file 22 which stores a path name of an object file which is a conversion object and the file name.

The programming means 30 for the programmable controller receives the conversion data file from the conversion data recording means 20, checks the conversion data file by programming analysis means 31 in the programming means 30 for the programmable controller, and then outputs the checked conversion data file as the sequence program 32 programmed an operation of the programmable controller to a programmable controller 40 and also inserts the sequence program 32 into the programmable controller 40.

The program creating device for the programmable controller as configured above inserts the sequence program in which setting parameters of a various functional modules are set into the programmable controller, so that the programmable controller is able to operate according to the module specific information. Details will be described below.

Figure 2:
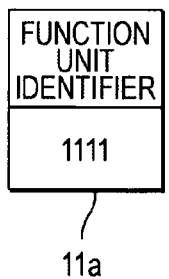
FIG. 2 is a drawing illustrating module specific information 11 of the program creating device for the programmable controller according to the first embodiment of the invention.

FIG. 2 is a drawing illustrating the module specific information 11 of the program creating device for the programmable controller according to the first embodiment of the invention. The module specific information 11 includes a module identifying number 11a identifying a module, an identifier 11b identifying parameter item, a writing trigger signal 11c required for reflecting a content of parameter setting item to the functional module, an address number 11d of an inner memory allocated to each functional module, an item name 11e labeled for the parameter setting item, data type 11f indicating data format of the parameter setting item such as decimal (code existence/inexistence), hexadecimal, and bit, data size 11g indicating data capacity according to the data type, upper and lower limits 11h indicating a setting range of the parameter item required for checking whether a numeral inputted from a user is correctly inputted and an input value is in a normal range, and a default value 11i indicating a initial value of the parameter setting item.

In FIG. 2, the number of the writing trigger signal 11c denotes the figure of an object number when a prescribed bit used as a trigger signal is ON. When the object number exists, a bit of the object number is ON, which indicates the existence of the writing trigger signal of the object number. Accordingly, when the writing signal of the object number is 0, a bit of the object number is OFF and the writing trigger signal does not exist.

A size of the data size 11g is denoted as the module of byte length. Accordingly, when the data type is "bit type" and the data size is "2", the data size is 2 byte.

Since there is the address number 11d of the inner memory at least allocated to each functional module in the module specific information 11, it is not necessary to grasp all the addresses of individual parameter areas allocated to the various functional modules, thereby providing an effect that the number of management processes can be reduced. Additionally, the data type 11f provides an effect that an abnormal programming caused by a difference of the data type can be prevented in advance. Further, by providing the upper and lower limits 11h indicating a setting range of parameter item, an error check determining whether the numeral is correctly inputted within the setting range can effectively be executed in advance. Information of the module specific information 11 is converted into the sequence program and the sequence program is inserted into the programmable controller 40 to achieve the effects, thereby improving a quality of the sequence program.

Figure 3:
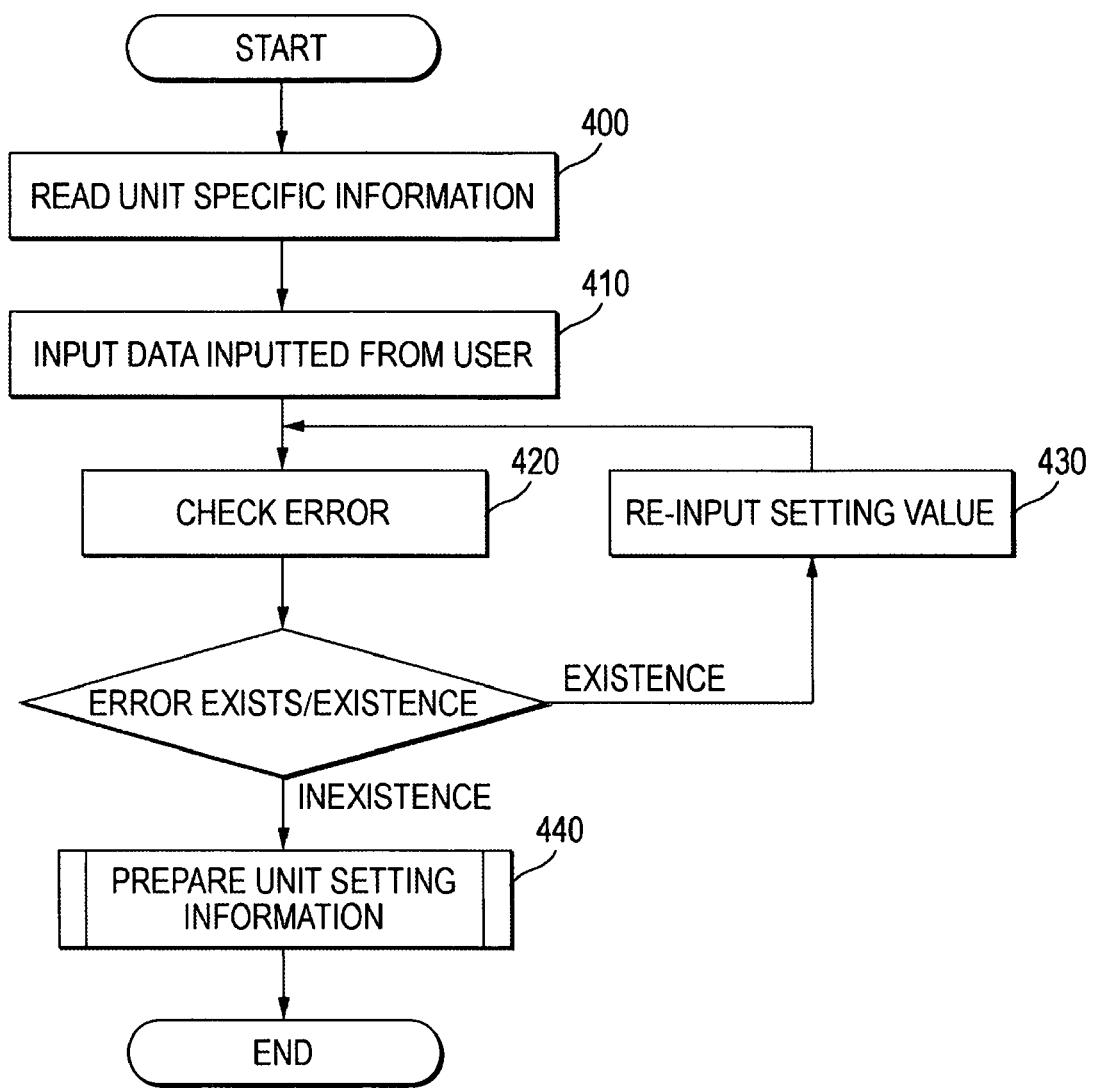
FIG. 3 is a flowchart illustrating a process in parameter data creating means 12 of the program creating device for the programmable controller according to the first embodiment of the invention.

Hereinafter, the parameter data setting means 12, which executes the preparing of the process from the module specific information 11 to the module setting information 13, will be described. FIG. 3 is a flowchart illustrating a process in the parameter data creating means 12 of the program creating device for the programmable controller according to the first embodiment of the invention.

In step 400, the module specific information 11 (the functional module parameter which is specified from 11a to 11i) is read. In step 410, the required parameter setting value from the module specific information which is read is set by the user. In step 420, an error is checked by using upper and lower limits 11h of the module specific information which is read to check whether the setting value is correctly inputted within a range of the upper and lower limits. When an error exists, a re-inputting is prompted in step 430 and the error is checked again. After deleting the error from the parameter setting value, the module setting information 13 is created in step 440.

Figure 4:
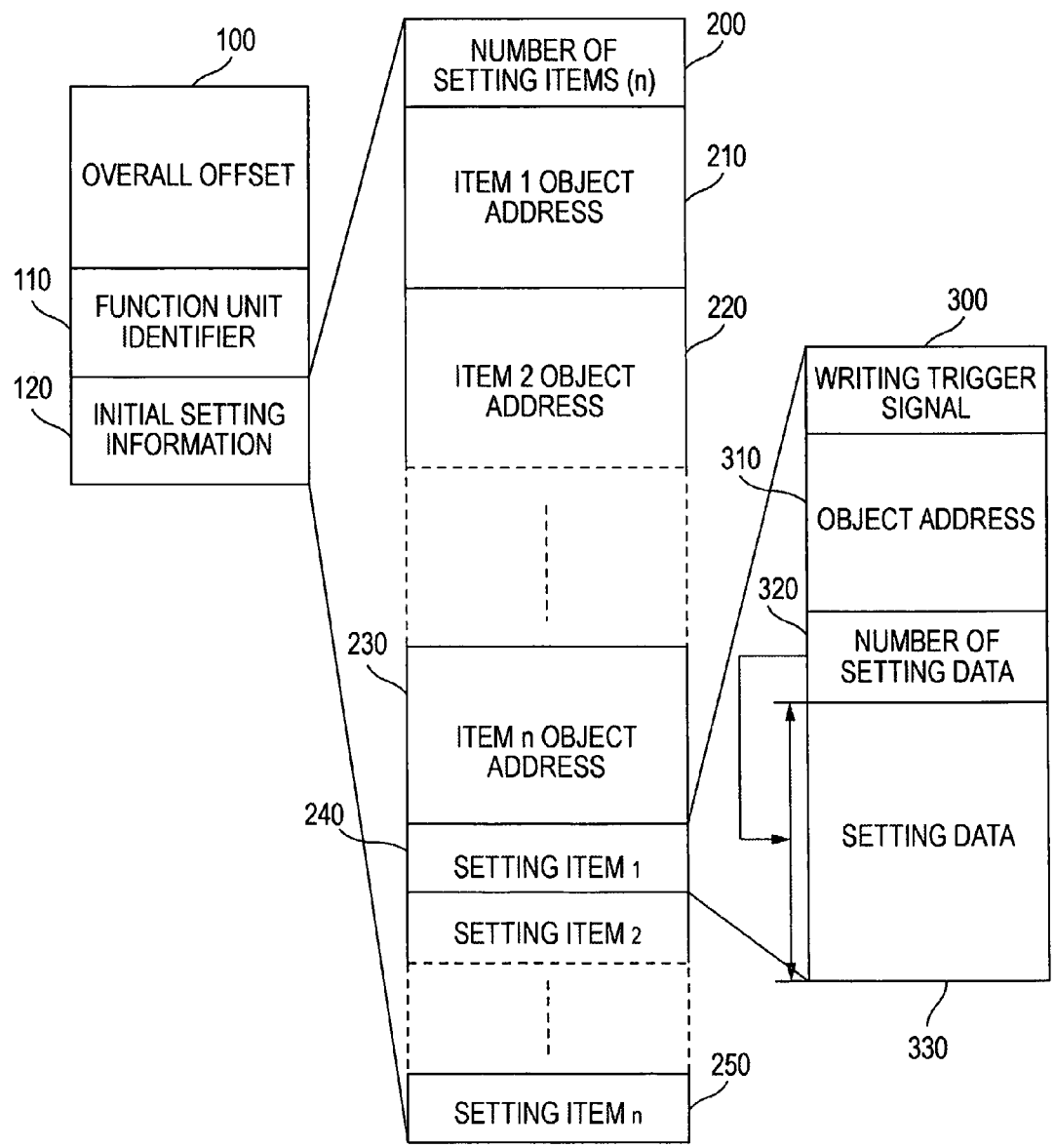
FIG. 4 is the diagram illustrating a data configuration of module setting information 13 of the program creating device for the programmable controller according to the first embodiment of the invention.

It will be described in detail that the preparing of the module setting information 13 is executed in step 440. First, a data configuration of the module setting information 13 will be described. FIG. 4 is a data configuration diagram illustrating the module setting information 13 of the program creating device for the programmable controller according to the first embodiment of the invention.

The module setting information 13 includes an overall offset 100 indicating the number of data for 1 module of functional modules, a type identifier 110 which is included the individual functional module to identify the functional module, and initial setting information 120 concerning an initial setting relative address and the like which denotes a memory address in which stored an initial setting data.

The setting information 120 includes: the number of setting items (n) 200 indicating the number of items (namely, the number of modules) which is set by the initial setting; and a combination of a setting item$_1$ 240 which is a first setting item and an item$_1$ relative address 210 indicating the storage location of the setting item$_1$ 240, and same combinations as the combination as many as the number of modules stored in the number of setting items (n) 200.

Each setting item$_{1, 2 \ldots n}$ corresponding to an individual address which is a minimum module of the parameter data includes a trigger signal 300 required for updating the setting contents, the object address 310 of the setting item, the number of setting data 320, and a setting data 330 which is an actual data area required for each data.

The functional module has a writing address signal which can specify a timing reflecting the setting contents in a designated address as an optional timing set by the user. The writing trigger signal is used to update the inner memory when a signal state is changed from OFF to ON. The writing trigger signal 300 is an area which stores the trigger signal existing specifically in the functional module. However, the signal does not always exist depending on the functional module. Accordingly, when the signal information does not exist, the program which executes the process of the ON/OFF of the writing trigger signal is not added to the sequence program described later.

Figure 5:
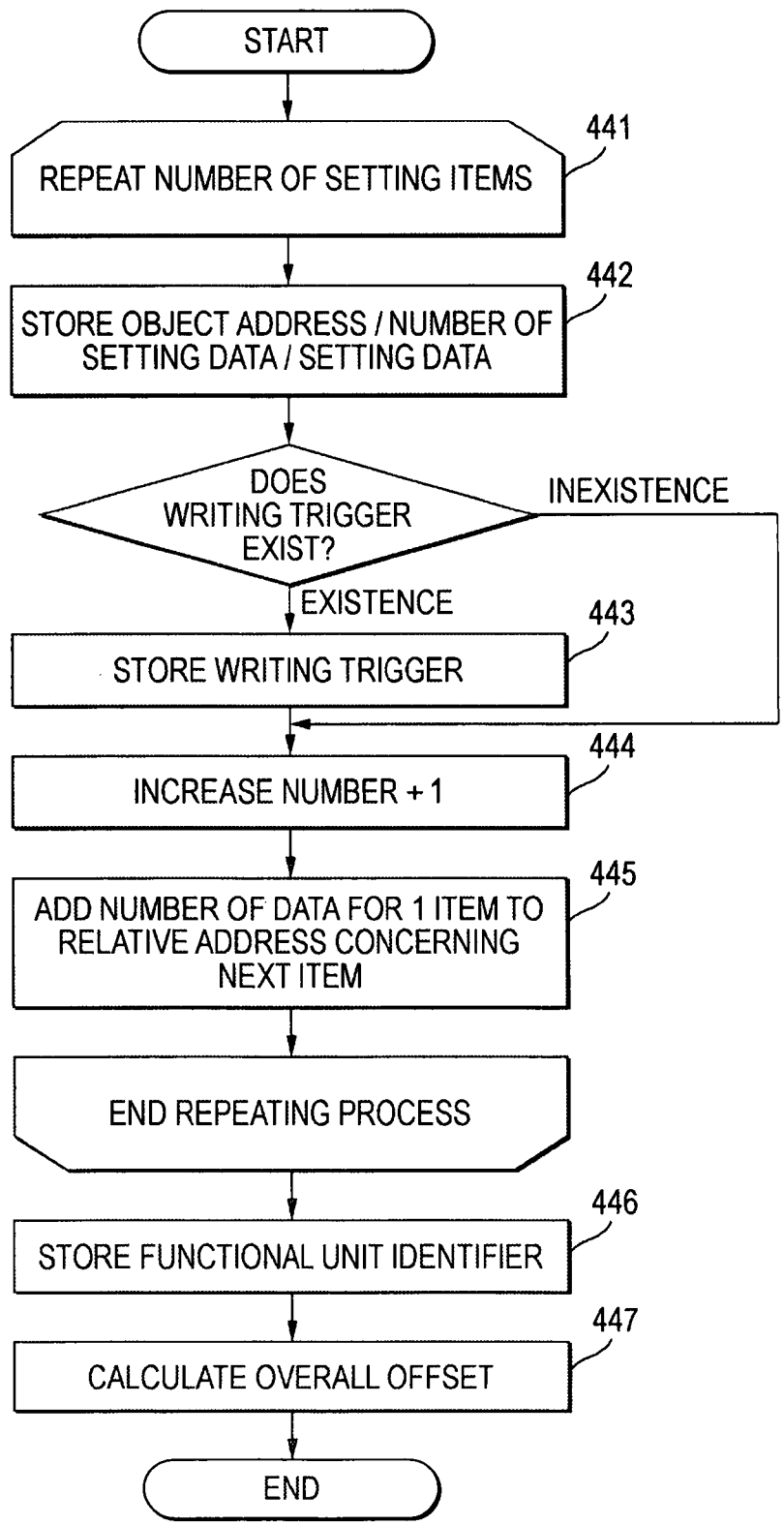
FIG. 5 is the flowchart illustrating a processing procedure of a preparing of the module setting information 13 in step 440.

Next, a processing procedure of the preparing of the module setting information 13 in step 440 of FIG. 3 will be described. FIG. 5 is the flowchart illustrating the processing procedure of the programming of the module setting information 13 in step 440 of FIG. 3.

In step 442, the object address 310, the number of the setting data 320, the setting data (a value inputted by the user) 330 is stored. In a part of the module setting information 13, when the information of the writing trigger signal 11c is set in the specific information of the functional module which is an object, the information is stored in the writing trigger signal 300 of the module setting information 13 in step 443. In step 444, in response to the information of 1 data having been stored, the number of the processes is monitored by counting up the number of the processes. In step 445, in order to figure out the storage location of the setting data for a next item required for a setting, the number of data for 1 item is added to the item$_2$ relative address 220. The processes from step 442 to 445 are repeated as many as the number of the processes (namely, the number of the setting item (n) 200) monitored in step 444. In step 446, a functional module identifier 110 for identifying the functional module is stored. In step 447, the number of byte is calculated by adding the functional module identifier 110 to the initial setting information 120, thereby storing the calculated value in the overall offset 100 and the storage of the initial setting information of 1 functional module is completed.

Figure 6:
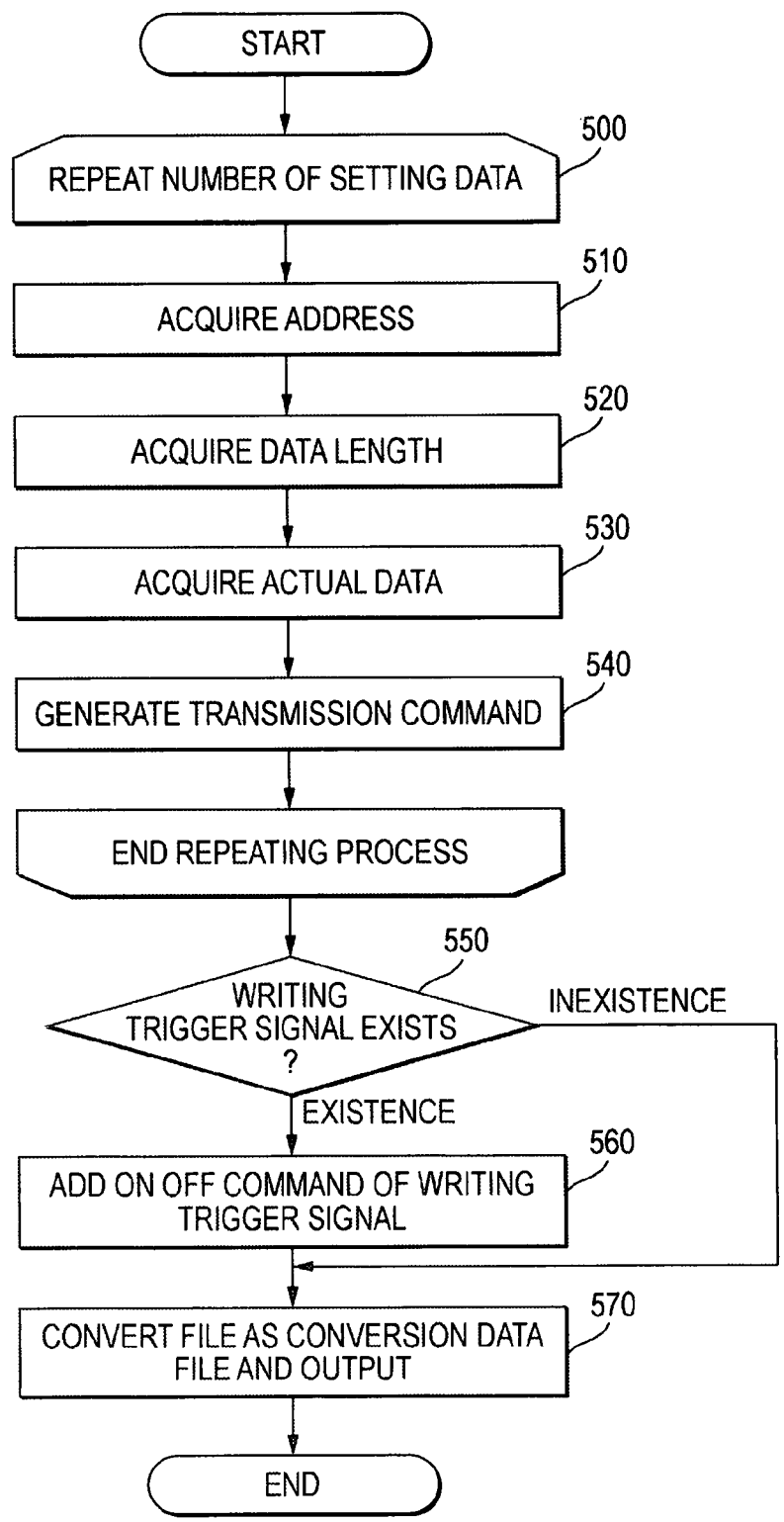
FIG. 6 is the flowchart illustrating a process of parameter analysis means 14 of the program creating device for the programmable controller according to the first embodiment of the invention.

The process of converting the module setting information 13 into the conversion data file 20 by using the parameter analysis means 14 will be described. FIG. 6 is the flowchart illustrating the process of the parameter analysis means 14 of the program creating device for the programmable controller according to the first embodiment of the invention.

At first in step 510, the object address 310 of the functional module which should be set in the initial setting information 120 of FIG. 4 is acquired from the information stored in the module setting information 13. Since the address 310 denotes the address of the parameter area allocated to the functional module, for example content "0" is stored. "G" indicating the address of the functional module is added to "0" value and expressed in "G0". Because the value does not include the information on a location at which the functional module is disposed, the location information needs to be added.

In the past, it is necessary to search the change object location from the sequence program to change the information that should be added. However, according to the device of the embodiment, by adding the information of the location of the functional module which is specified in advance in terms of the device by the user to the object address 310, it is not necessary to performing operations of searching the address and changing the information. When the location is "0", "U0¥" indicating the location is added and the object address of the functional module which is used in the transmission command is expressed as "U0¥G0" by including the location.

Accordingly, the sequence program can be configured and normally operated even when the object address of each module is same.

In step 520, data length of the data of the functional module which should be set is acquired from the initial setting information 120 stored in the module setting information 13 in the similar way as in step 510. In step 530, the actual data is acquired in the similar way. In step 540, the transmission command is prepared by combining an acquired data from step 510 to 530.

In step 540, the transmission command is prepared. A transmission command format is expressed as [transmission command (MOVP)] [setting data 330] [object address 310]. "MOV" represents a transmission and "P" represents a pulse command respectively. The pulse command is only executed at the time of a specified signal rise and the command is not executed even when the condition is satisfied later. Since the initial setting information is necessary to be executed only one time at the time of operating the sequence program, the sequence program needs to be the pulse command. For example, when a numerical value such as "decimal 100" is transmitted to the address "0", the command such as "MOVP K100 U0¥G0" is created ("K" of "K100" represents a decimal. "H" represents a hexadecimal). A series of processes from step 510 to 540 is repeated as many as the number stored in the setting data 320 and the transmission command for transmitting the contents of the setting data 330 to the object address 310 is created.

In step 550, the writing trigger signal is checked whether it exists or not. In the setting data 330 written in the object address 310 according to the transmission command, the functional module which can not reflect the contents only by writing in the inner memory area exists. In such the functional module, the writing trigger signal 300 is prepared and the contents is updated by using the trigger when the signal is changed from OFF to ON. The signal mentioned here represents a provided signal between the programmable controller and the functional module and constitutes an input signal (X signal) which is inputted from the functional module to the programmable controller and an output signal (Y signal) which is outputted from the programmable controller to the functional module. Then, an operation command and a validation are executed depending on the state of ON/OFF of the two signals.

As described above, since the writing trigger signal 300 is the signal to command reflecting the setting data from the programmable controller to the functional module, the writing signal is classified as the output signal (Y signal) from the programmable controller to the functional module. Therefore, when the writing trigger signal 300 exists, ON (SET Y0) of the writing trigger signal is added after the transmission command which writes in the inner memory area. Because the writing trigger signal is recognized when the signal is changed from OFF to ON, the signal should be OFF after the signal is ON. Then, after the command which enables the writing signal to be ON, the command which validates the state of ON (LD Y9) and enables the writing trigger signal to be OFF (RST Y0) is added. "SET" represents the command which enables a specified signals to be ON and oppositely "RST" represents the command which enables a specified signals to be OFF. "LD" is a calculation result of the information ON of the specified object signal and decides whether a repeated command after the command is to be executed or not. In this example, the command "RST Y0" is executed by using the condition of which Y0 is ON.

The sequence program which is converted by the transmission command prepared by the above process and the ON/OFF process of the writing trigger signal is extracted as a text format and outputted to the conversion data recording means 20 in terms of step 570. The outputted conversion data file has the program file 21 which stores the sequence program and the conversion information file 22 which is necessary to insert the program file 21 into the programming means 30 for the programmable controller. In the conversion information file 22, a folder path name where the program file 21 exists and a name which is assigned to the converted sequence program are set.

Next, in the programming means 30 for the programmable controller, a method of inducing the conversion data file converted from the initial setting information 120 by using the parameter analysis means 14 will be described.

Between the parameter analysis means 14 and the programming analysis means 31 of the programming means 30 for the programmable controller, a transmission of an event and the transmission of the information are executed in terms of a shared memory to execute converting the information stored in the conversion data recording means 20 into the sequence program. In an issuance side of the event, when the event is issued, the information according to the type of the event is written in the shared memory and in a receiving side of the event the process according to the type of the event and the contents in the shared memory is executed. In the configuration of the embodiment, the program analysis means 31 serves as the program converting and inserting means.

Figure 7:
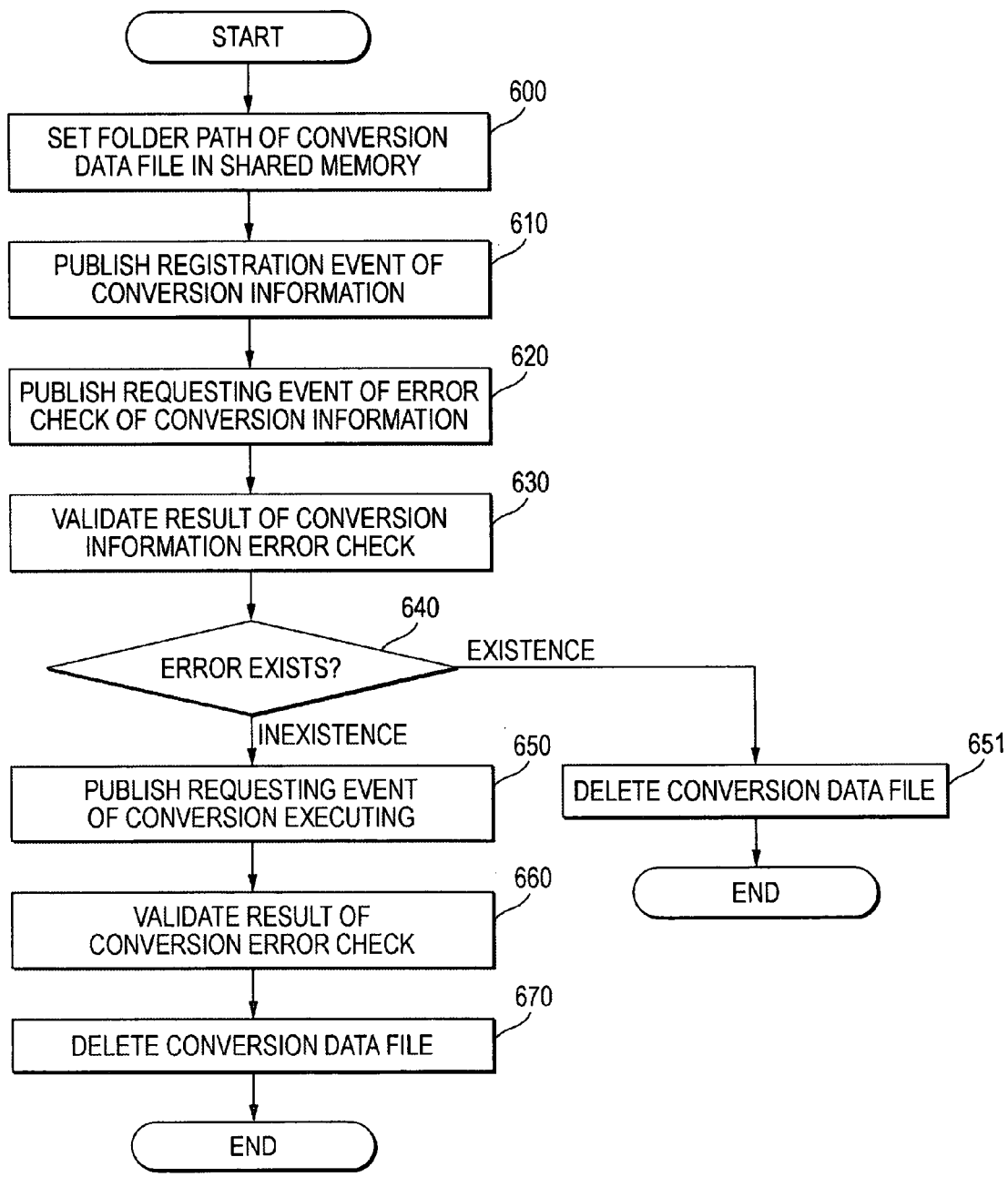
FIG. 7 is the flowchart illustrating transmission and conversion processes of a conversion data file and error information file 50 stored in conversion data recording means 20 executed by program analysis means 31 and the parameter analysis means 14 of the program creating device for the programmable controller according to the first embodiment of the invention.

FIG. 7 is the flowchart illustrating processes of transmitting and converting a conversion data file in the parameter analysis means 14 of the program creating device for the programmable controller and the program analysis means 31 according to the first embodiment of the invention.

At first, as shown in step 600, the folder path name and the file name of the conversion data file stored in the conversion data recording means 20 is written in the shared memory, a registration event is issued to register the contents in the side of the program analysis means 31 in step 610. The program analysis means 31 which has received the conversion registration event inputs the contents in the sequence program by referring to the contents of the conversion data file. When the registration is completed, the program analysis means 31 issues a registration completed event and notices a completed conversion to the parameter analysis means 14.

The parameter analysis means 14 which has received the notice of a registration completion issues a requesting event of the error check of the conversion information in step 620 in order to execute the error check of the conversion information. The program analysis means 31 executes the error check of registered contents (namely, the conversion information file 22) in response to the event. In this time, a matching check for checking the file format and the error in writing in the program is executed. When the error check is completed, an ending event of the error check is issued by the program analysis means 31. The parameter analysis means 14 validates the error information file 50 storing an error contents in step 630. In terms of step 640 whether the error exists or not is validated. When the error is generated, a conversion process is stopped by deleting the conversion data file stored in the conversion data recording means 20 in step 651.

When the error check is completed normally, a registration executing event is issued in step 650 and the content of the conversion data recording means 20 is converted into the sequence program which is available by using the programming means 30 for the programmable controller. After the conversion process is completed, a conversion ending event is issued by the program analysis means 31. Consequently, at the time of receiving the event, a conversion error check for determining whether a conversion into the sequence program is correctly executed by using an error information file 50 to which is outputted from the program analysis means 31 in step 660. Because the parameter analysis means 14 is completed without regard to an existence of a conversion error, a series of the conversion process is completed by deleting the conversion data file.

The sequence program which is converted by the parameter analysis means 31 is outputted as FB (function block) format, whereby the program can be reusable parts for the sequence program. When a system configuration is same and the same functional module is used, it is not necessary to set the same sequence program to the functional module. Therefore, an appropriation modification can be executed simply by properly inserting the program into the sequence program. Additionally, since the process in FB is a black box type and has an assured quality, a debugging operation time of the sequence program can be reduced by avoiding the mistake of the address setting and a wrong setting of the setting value which is an abnormal setting range.

According to the embodiment in the invention, the parameter data creating means 12 which prepares the parameter type module setting information 13 for the programmable controller by using the specific information 11 which is included the functional module, the parameter analysis means 14 which converts the module setting information into the conversion data file which is the source of the sequence program programmed the operation of the programmable controller by analyzing the parameter of the module setting information 13, and the program analysis means 31 which inserts the sequence program 32 created from the conversion data file inputted from the conversion data recording means 20 into the programmable controller 40 are provided. Accordingly, the sequence program for the setting of the various functional modules for the programmable controller can be written irrespective of the data type allocated to the functional module, an instruction of a sequence command and the like, whereby the mistake of the address setting allocated to the various functional modules in the sequence program and a wrong identifying of a meaning related to the setting value can be prevented in advance.

When the known various functional modules for the programmable controller is set, the parameter of the module for the programmable controller is included as a part of the parameter of the programmable controller. Hence, when a specification modification of the system and a particular adjustment is executed, the application software for setting the parameters of the various functional modules is necessary and there is a problem that the parameter of the specification modification and the particular adjustment cannot be modified. In the embodiment of the invention, the various functional modules setting means 10 for the programmable controller has parameter information of the overall functional module as the object whereby the result of the specification modification and the particular adjustment can be reflected as the sequence program, whereby the problem can be solved effectively.

Also, in the known method, there is only one parameter with respect to a system (1 parameter for functional module per 1 programmable controller). Therefore, only a certain part of the functional module can not be enabled to be valid. However, in the embodiment the module specific information individually has the parameter information of the functional module, whereby only a certain part of the functional module can be enabled to be valid and the setting can be modified as well.

Further, in response to a modification of the location of the various functional modules for the programmable controller, the sequence program capable of properly dealing by simply obtaining the information of specific parameter of the functional module can be obtained.

Second Embodiment

The information concerning a location relation of the programmable controller 40 and the functional module in the module specific information 11 in the first embodiment is not described. However, in the second embodiment, it will be described when the location information 11*j* of the functional module is added to the module specific information 11. The second embodiment is similar to the first embodiment except for adding the location information 11*j* of the functional module.

The parameter analysis means 14 executes the process of converting the functional module setting information which is a part of the module setting information 13 into the sequence program. In step 510 of FIG. 6, the object address 310 of the functional module that should be set in the initial setting information 120 of FIG. 4 is acquired from the information stored in the module setting information 13. After acquiring the object address 310 (It is expressed as an acquisition of "G0" in the same way as in the first embodiment), by automatically adding the location information 11*j* of the functional module which is preliminary specified by the user to the object address 310, an address searching and a modification operation is not necessary at the time of a modification. When the location is "0", "U0¥" indicating the location is added and the object address of the functional module which is used in the transmission command expressed as "U0¥G0" by including the location. The process is described in the similar way as in the first embodiment, but the location information, which is specified in advance by the user, is separately specified from the module specific information 11.

In addition, in the second embodiment, the location information 11j of the functional module is included in the module specific information 11. Therefore, the parameter analysis means 14 is able to add automatically the location information 11j in the module specific information 11 to the object address 310. When the location information 11j is "1", "U1¥" indicating the location is added and the object address of the functional module which is used in the transmission command expressed as "U1¥G0" by including the location.

Accordingly, when the location of the functional module is modified, the parameter analysis means 14 is able to create automatically the program file 21 on the basis of the conversion information by simply modifying the location information 11j of the functional module. At this time, the writing trigger signal 11c is an object number which is included in the functional module side. Because a signal number is necessary to be modified according to the location, the writing trigger signal 11c needs to be modified at the same time of modifying the location information 11j of the functional module.

Accordingly, since the module specific information 11 includes the location information 11j, when the location of the functional module is changed, the sequence program for setting the parameter is automatically created based on the module specific information 11, whereby the mistake of the address setting and the abnormal programming caused by the difference of the data type can be effectively prevented in advance.

INDUSTRIAL APPLICABILITY

As described above, a program creating device for a programmable controller according to the present invention is appropriate for creating a sequence program without grasping a procedure of an address of an individual parameter area allocated to an object module when a setting of various functional modules parameters for the programmable controller is executed.

The invention claimed is:

1. A program creating device for a programmable controller, comprising:
    setting information creating means for preparing module setting information of a parameter type for a programmable controller by using specific information including address information and a parameter of a functional module attached to the programmable controller;
    analysis and conversion means for analyzing a parameter of the module setting information and creating a source file to be converted into a sequence program for specifying an operation of the programmable controller, the source file being created based on the module setting information; and
    program converting and inserting means for converting the source file created by the analysis and conversion means into the sequence program,
    wherein the specific information includes position information indicating the location at which the functional module is attached to the programmable controller.

2. The program creating device according to claim 1, wherein the specific information includes data type information indicating a data format.

3. The program creating device according to claim 1, wherein the specific information includes information related to upper and lower limits indicating a setting range of a parameter item or a default value indicating an initial value.

4. The program creating device according to claim 1, wherein the module setting information includes the position information of the functional module.

5. The program creating device according to claim 1, wherein the converted sequence program is individually outputted in a module of functional module and created in a type of function block.

6. A program creating method for a programmable controller, comprising:
    preparing module setting information of a parameter type for a programmable controller by using specific information including address information and a parameter of a functional module attached to the programmable controller;
    analyzing parameter of the module setting information and creating a source file to be converted into a sequence program for specifying an operation of the programmable controller, the source file being created based on the module setting information; and
    converting the source file created based on the module setting information into the sequence program, wherein the specific information includes position information indicating the location at which the functional module is attached to the programmable controller.

7. A computer-readable storage medium having a program recorded thereon for allowing a computer to execute a method comprising:
    preparing module setting information of a parameter type for a programmable controller by using specific information including address information and a parameter of a functional module attached to the programmable controller;
    analyzing parameter of the module setting information and creating a source file to be converted into a sequence program for specifying an operation of the programmable controller, the source file being created based on the module setting information; and
    converting the created source file into the sequence program, wherein the specific information includes position information indicating the location at which the functional module is attached to the programmable controller.

* * * * *